PRESCOTT & JUDSON.
Odometer.
No. 62,152.
Patented Feb. 19, 1867.
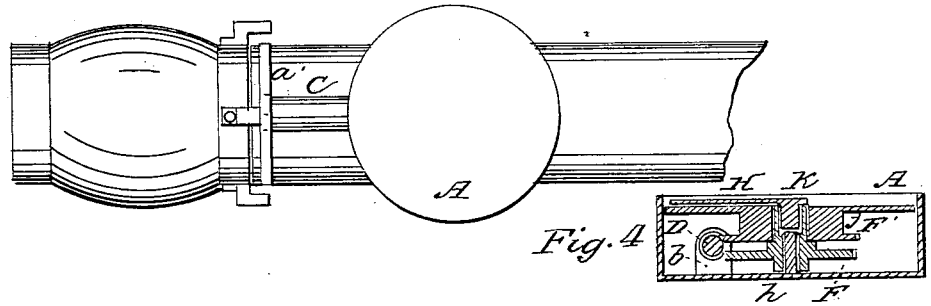
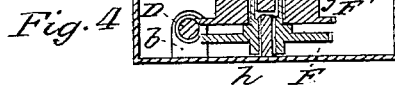
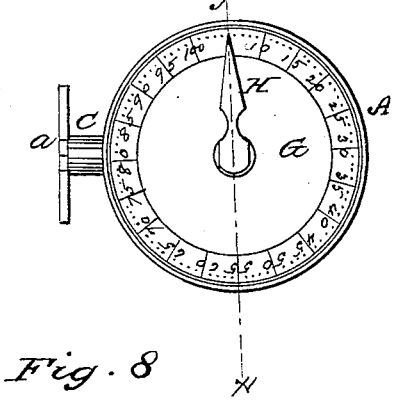
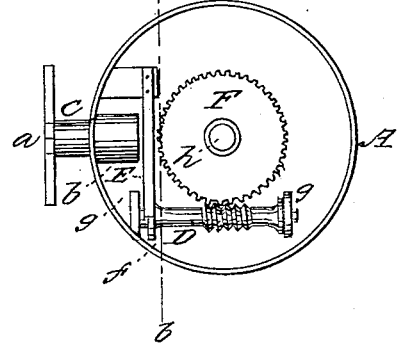
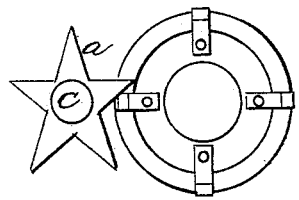
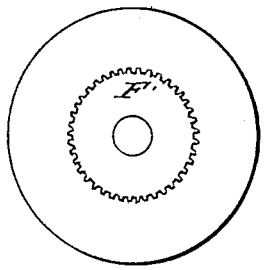
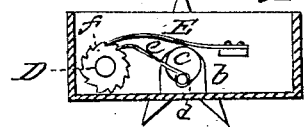
Witnesses:
W. Burris
P. Baker
Inventors:
Prescott & Judson
by their Attorney
G. B. Fowles

United States Patent Office.

WILLIAM H. PRESCOTT AND WHITCOMB JUDSON, OF GALESBURG, ILLINOIS.

*Letters Patent No. 62,152, dated February 19, 1867.*

---

IMPROVEMENT IN ODOMETERS.

---

*The Schedule referred to in these Letters Patent and making part of the same.*

---

TO ALL WHOM IT MAY CONCERN:

Be it known that we, WILLIAM H. PRESCOTT and WHITCOMB JUDSON, of the city of Galesburg, in the county of Knox, and State of Illinois, have invented a new and useful Improvement in Odometers; and we do hereby declare that the following is a full, clear, and exact description of the construction and operation of the same, reference being had to the accompanying drawings, making a part of this specification, in which—

Figure 1 is a top or face view of our improved odometer, with the cover removed.

Figure 2, an interior view of the odometer box, with dial plate, index hand, and cover removed.

Figure 3, a view of the under side of the dial plate, showing the attachment of the upper cog-wheel thereto.

Figure 4, a transverse vertical section, as indicated by the line $x\,y$ in fig. 1.

Figure 5, a transverse vertical section, as indicated by the line $v\,p$ in fig. 2.

Figure 6, side view of box complete, showing fully star-form of plate attached to actuating plate.

Figure 7 represents a view of a carriage-wheel hub, showing the attachment of our odometer to the axle, and the connection of its actuating-shaft arms with the arms or blades of the hub.

Figure 8, rear view of hub detached from axle, and star-form of plate, likewise from the shaft, in order to show more clearly the position of the arms of the hub relatively to that of the arms of the star-plate.

Like letters in the different figures of the drawings indicate like parts.

Our improvement has reference to an arrangement of the actuating-shaft, provided with a disk, and crank connecting with a pivot eccentrically attached thereto; the said shaft operating the screw-shaft by the connection of the crank with a spur-wheel on the end thereof. The object of this arrangement is to give a certain revolution to the screw-shaft, without regard to a fixed number of projecting arms on the actuating-shaft to accomplish the same, as described heretofore. These projecting arms being operated on by the intervention of like arms or blades from the hub of the vehicle wheel, striking them on the revolution of the same, so that in the event of the actuating-shaft arms breaking, or even the others, as may possibly happen if the vehicle should be travelling over a rough road, the revolution of the screw-shaft will not be materially affected thereby, as would otherwise be the case, in having a fixed number of arms, and where a proper revolution of the screw-shaft depends upon the same; consequently it is immaterial whether any one or more of the arms should break, or whether a certain greater or less number should be used, the operation of the screw-shaft being the same in either respect. The hub in figs. 7 and 8 shows the manner in which its arms $a'$ act on those of the star-plate of the actuating-shaft as above mentioned. These arms are suitably attached around the rim and to the rear end of the hub. Four are shown in the figures; a greater or less number may be used, as before remarked. The arms extend up and project out from the rear end of the rim, forming an elbow so as to permit the arms of the star-plate to intervene properly between them, without their interfering with the axle in their revolution, every arm of the hub, as the wheel revolves, striking the arms of the star-plate, and thus causing it to revolve, (see fig. 8.) A is a metallic box, of a circular or other form, provided with a cover having a glass face, (see figs. 1 and 6.) C is the actuating-shaft, having a plate, $a$, of a star form attached to the end of it, (see figs. 1, 2, and 6.) The shaft projects through on the inside of the box near the bottom, and is supported by a box, $b$, properly constructed against the side of the odometer box. On the end of the shaft is a disk, $c$, having a pivot, $d$, eccentrically attached thereto. On the pivot is a crank, $e$, gearing into a spur-wheel, $f$, attached to the end of the screw-shaft. D is the screw-shaft; it is supported in a proper manner by two upright plates, $g$. E is the spring-pawl arranged over the crank, and attached in a suitable manner to a projecting plate from the side of the box. The pawl gears into the spur-wheel, and regulates the movement of the shaft in the ordinary way, (see figs. 2 and 5.) In the centre of the box is a small post, $h$, one end of which is permanently fastened to the bottom. Around the post is placed a cog-wheel, F, having a collar projection on its under side, which elevates it sufficiently high for it to gear into the screw of the shaft, and which collar gives it the proper bearing on the bottom of the box in its revolution around the post. The wheel has likewise a collar on the upper side, projecting nearly up to the top of the box. On the inside of this collar, the top of the post is formed with a head, or so fixed as to retain the cog-wheel and thus keep it in place. The collar has a shoulder formed around it, a little above the face side of the wheel, to support the upper cog-wheel F′ placed around the collar and gearing into the screw-shaft the same as the lower one, which shoulder gives it its proper bearing thereon in its revolution around the collar. The dial plate G is attached to the upper cog-wheel by a collar, $j$, intervening between it and the wheel and surrounding the upper collar of the lower wheel. H is the index hand placed on the dial plate, and secured by a short piece, $k$, attached to the hand, and fitting properly within the upper collar of the lower cog-wheel; the lower cog-wheel having one tooth less than the upper one, consequently the index hand connecting with the lower one will gain in its revolution to the extent of one tooth, or in a certain ratio to that of the revolution of the dial plate connecting with the upper wheel. The box being attached in a proper manner to the rear side of the hind axle of a vehicle, and the wheel having a suitable number of projecting pins or blades fastened to the hub of the same, and intervening between the points or projecting arms of the star on the actuating-shaft, it will be found that the revolution of the wheel will cause the pins or blades to strike the projecting arms of the star and thus rotate the shaft, one revolution of which causing the screw-shaft to execute a quarter revolution by the movement of the crank on the spur-wheel. It will thus be observed that by this arrangement of the screw-shaft in its contact with the cog-wheels, all liability of its getting out of order from the direct action of the wheel on the same, as has been heretofore arranged to receive such action, is obviated; the indirect action of the wheel on the screw-shaft through the actuating one, giving an easier movement to the cog-wheels, and consequently causing the index hand and dial plate to be more certain and accurate in their relative revolutions. The actuating-shaft may be operated by a less number of points or arms than what is represented on the star.

Having thus fully described our improvement, what we claim therein as new, and desire to secure by Letters Patent, is—

1. The actuating-shaft C, disk $c$, pivot $d$, crank $e$, and spring pawl E, when combined with the screw-shaft D and spur-wheel $f$ on the end thereof, substantially in the manner and for the purpose as herein described.

2. The two shafts C and D, as arranged and when used in combination with the two cog-wheels, constructed substantially in the manner described.

WILLIAM H. PRESCOTT,
WHITCOMB JUDSON.

Witnesses:
   JAMES L. SHORT,
   HENRY W. CARPENTER.